US010638777B2

(12) United States Patent
Deng

(10) Patent No.: US 10,638,777 B2
(45) Date of Patent: *May 5, 2020

(54) APPARATUS FOR MAKING FRESHLY SQUEEZED ORANGE JUICE

(71) Applicant: Jun Deng, Beijing (CN)

(72) Inventor: Jun Deng, Beijing (CN)

( * ) Notice: Subject to any disclaimer, the term of this patent is extended or adjusted under 35 U.S.C. 154(b) by 380 days.

This patent is subject to a terminal disclaimer.

(21) Appl. No.: 15/624,575

(22) Filed: Jun. 15, 2017

(65) Prior Publication Data

US 2017/0367375 A1    Dec. 28, 2017

Related U.S. Application Data

(63) Continuation of application No. PCT/CN2015/095500, filed on Nov. 25, 2015.

(30) Foreign Application Priority Data

Dec. 22, 2014    (CN) .................... 2014 2 0814083 U

(51) Int. Cl.
    *A23N 1/00*      (2006.01)
    *A23L 2/06*      (2006.01)
    *G07F 13/10*     (2006.01)

(52) U.S. Cl.
    CPC .............. *A23L 2/06* (2013.01); *A23N 1/003* (2013.01); *G07F 13/10* (2013.01); *A23N 1/00* (2013.01)

(58) Field of Classification Search
    CPC .. A23N 1/003; A23N 1/00; A23L 2/06; G07F 13/10
    (Continued)

(56) References Cited

U.S. PATENT DOCUMENTS 4,479,424 A * 10/1984 Carroll ................... A23N 1/003
                                                          100/116
5,544,572 A *  8/1996 Garmendia ............ A23N 1/003
                                                           99/484
(Continued)

FOREIGN PATENT DOCUMENTS

CN          2261208 Y     9/1997
CN          2346566 Y    11/1999
(Continued)

OTHER PUBLICATIONS

IP Australia, Examination Report Issued in Application No. 2015371943, dated Oct. 24, 2017, 5 pages.
(Continued)

*Primary Examiner* — Reginald Alexander
(74) *Attorney, Agent, or Firm* — McCoy Russell LLP

(57) ABSTRACT

Disclosed is an apparatus for making freshly squeezed orange juice, comprising a rotatory basket, a conveying guide device, a juice extractor, a water supply tank, a high pressure water pump, a supercharging device, a spraying and conveying pipeline, a spray pipeline, a spray head, a movable filter mesh, an orange juice collection funnel, a filling control valve, a filling ellipsoid-shaped vessel, a filling and conveying pipeline, a high pressure air pump, an air treatment and purification device, a high pressure gas conveying pipeline, a bottle, a bottling container, a bottle guiding device, a bottle conveying mechanism, a bottle transverse-conveying mechanism, a bottle inlet position detection device, a bottle filling position detection device, a bottle capping position detection device, a filling position and liquid level detection device, a bottle cap locking detection device, an automatic capping mechanism, a liquid recovery guiding device, a liquid recovery bucket, a finished product (Continued)

receiving device, a UV sterilization device, a refrigerating system, a thermal insulation cavity and a control center.

5 Claims, 4 Drawing Sheets

(58) Field of Classification Search
USPC .................................. 99/501, 506, 513, 495
See application file for complete search history.

(56) References Cited

U.S. PATENT DOCUMENTS

| | | | |
|---|---|---|---|
| 5,992,311 A | 11/1999 | Suter et al. | |
| 2008/0028943 A1* | 2/2008 | Lee .......................... | A47J 19/02 99/282 |
| 2013/0160658 A1* | 6/2013 | Torrisi .................... | A23N 1/00 99/512 |

FOREIGN PATENT DOCUMENTS

| | | | | |
|---|---|---|---|---|
| CN | 203633960 U | | 6/2014 | |
| CN | 204540681 U | | 8/2015 | |
| GB | 517707 | * | 2/1940 | ............... A23N 1/00 |
| GB | 546014 | * | 6/1942 | ............... A23N 1/00 |
| WO | 2012007406 A2 | | 1/2012 | |

OTHER PUBLICATIONS

ISA State Intellectual Property Office of the People's Republic of China, International Search Report Issued in Application No. PCT/CN2015/095500, dated Feb. 3, 2016, WIPO, 4 pages.

* cited by examiner

APPARATUS FOR MAKING FRESHLY SQUEEZED ORANGE JUICE

CROSS-REFERENCE TO RELATED APPLICATIONS

The present application is a continuation of International Patent Application No. PCT/CN2015/095500, filed on Nov. 25, 2015, which claims priority to Chinese Patent Application No. 201420814083.3, filed on Dec. 22, 2014, the contents of both of which are incorporated herein by reference in their entireties.

TECHNICAL FIELD

The present application relates to an apparatus for making fruit juice and, in particular, to an apparatus for making freshly squeezed orange juice.

BACKGROUND

Freshly squeezed orange juice drink made from oranges by a juicer is tasty with a sweet and sour taste and is with high nutrition value, which makes it popular among consumers. With continuous development of the society, people has increasing requirements on quality of life, and thus, hygiene and safety of food are getting more and more attentions. However, the existing apparatus for making freshly squeezed orange juice uses simple process such as squeezing or extruding by an independent juicer, but the freshly squeezed orange juice fundamentally cannot be guaranteed with respect to hygiene and safety; moreover, freshly squeezed orange juice cannot keep fresh in time, as a result, the taste is distorted and nutritional ingredients are lost; furthermore, freshly squeezed orange juice is filled in cans in an existing manner in the market, which is not hygeian and not portable. Therefore, an improved technique is urgently in demand to overcome the deficiencies of the prior art.

SUMMARY

Technical Problem

The purpose of the present application is to provide an apparatus for making freshly squeezed orange juice to overcome the deficiencies of the prior art.

Technical Solution

Technical solution adopted by the present application for solving the technical problem includes:

An apparatus for making freshly squeezed orange juice, characterized in that, the apparatus includes a rotary material basket, a transportation guide device, a juicer, a water supply tank, a high pressure water pump, a pressure boosting device, a spraying transportation pipeline, a spraying pipeline, a spraying head, a movable filter, an orange juice collecting funnel, a filling control valve, a filling oval container, a filling transportation pipeline, a high pressure air pump, an air processing and purifying device, a high pressure air transportation pipeline, a bottle, a bottle container, a bottle guide device, a bottle transportation mechanism, a bottle transverse transportation mechanism, a bottle inlet position detecting device, a bottle filling position detecting device, a bottle capping position detecting device, a filling position liquid level detecting device, a bottle cap locking detecting device, an automatic capping mechanism, a liquid recycle guiding device, a liquid recycle bucket, a finished product receiving device, a UV sterilization device, a refrigerating system, a heat-insulating chamber, and a control center. The rotary material basket, the transportation guide device, the juicer, the water supply tank, the high pressure water pump, the pressure boosting device, the spraying transportation pipeline, the spraying pipeline, the spraying head, the movable filter, the orange juice collecting funnel, the filling control valve, the filling oval container, the filling transportation pipeline, the high pressure air pump, the air processing and purifying device, the high pressure air transportation pipeline, the bottle, the bottle container, the bottle guide device, the bottle transportation mechanism, the bottle transverse transportation mechanism, the bottle inlet position detecting device, the bottle filling position detecting device, the bottle capping position detecting device, the filling position liquid level detecting device, the bottle cap locking detecting device, the automatic capping mechanism, the liquid recycle guiding device, the liquid recycle bucket, the finished product receiving device, the UV sterilization device, the refrigerating system, and the control center are arranged in the interior of the heat-insulating chamber.

The rotary material basket is arranged at a top of the juicer and is connected to the juicer via the transportation guide device.

The water supply tank is arranged at a bottom of the heat-insulating chamber and is connected to the high pressure water pump via a pump inlet connecting pipeline. The high pressure water pump is connected to the pressure boosting device via a pump outlet connecting pipeline. The pressure boosting device is connected to the spraying pipeline via the spraying transportation pipeline. The spraying head is arranged on the spraying pipeline. The spraying pipeline is connected to an upper portion of the interior of the juicer via a fastener.

The filling oval container is connected with and arranged below the filling control valve. The orange juice collecting funnel is connected with and arranged above the filling control valve. The orange juice collecting funnel is connected to a lower portion of the interior of the juicer via a fastener. The movable filter is arranged at the lower portion of the interior of the juicer and is connected with and arranged above the orange juice collecting funnel.

The high pressure air pump is arranged at the bottom of the heat-insulating chamber and is connected to the air processing and purifying device via a pump outlet connecting pipeline. The air processing and purifying device is connected to a junction of the filling oval container and the filling control valve via the high pressure air transportation pipeline.

A filling oval container outlet is connected to a bottle filling position via the filling transportation pipeline.

The bottle is arranged in the bottle container. The bottle container is arranged above the bottle transportation mechanism. The bottle is transported to the bottle guide device via the bottle transportation mechanism, and then falls to a bottle inlet position. The bottle is transported from the bottle inlet position to a bottle filling position via the bottle transverse transportation mechanism. The bottle is transported from the bottle filling position to a bottle capping position via the bottle transverse transportation mechanism. The bottle is capped with a bottle cap via the automatic capping mechanism. The automatic capping mechanism is arranged above the bottle capping position. The bottle is transported into the finished product receiving device via the bottle transverse transportation mechanism after being capped with the bottle cap.

The liquid recycle guiding device is arranged below the bottle filling position and is connected with the bottle transverse transportation mechanism via a bolt. The liquid recycle bucket is arranged at the bottom of the heat-insulating chamber and is connected with a liquid recycle guiding device out.

The UV sterilization device is arranged at an upper portion of the heat-insulating chamber and is close to the rotary material basket.

The heat-insulating chamber consists of a thin inner wall and a thin outer wall and forms a middle cavity. The middle cavity of the heat-insulating chamber is filled with a foaming heat-insulating material.

The refrigerating system consists of a compressor, an evaporator, a condenser and a temperature control device. The condenser of the refrigerating system is arranged at the middle cavity of the heat-insulating chamber and is arranged at a side of the thin inner wall.

The control center controls all the execution units.
Beneficial Effects

Compared with the prior art, the present application has the following beneficial effects: processing and controlling are achieved in a coordinated process, degree of automation in processing device is high, no contamination in the producing process, and it is able to keep working at a constant temperature, which guarantees safety, hygiene and quality of product.

Figure 1:
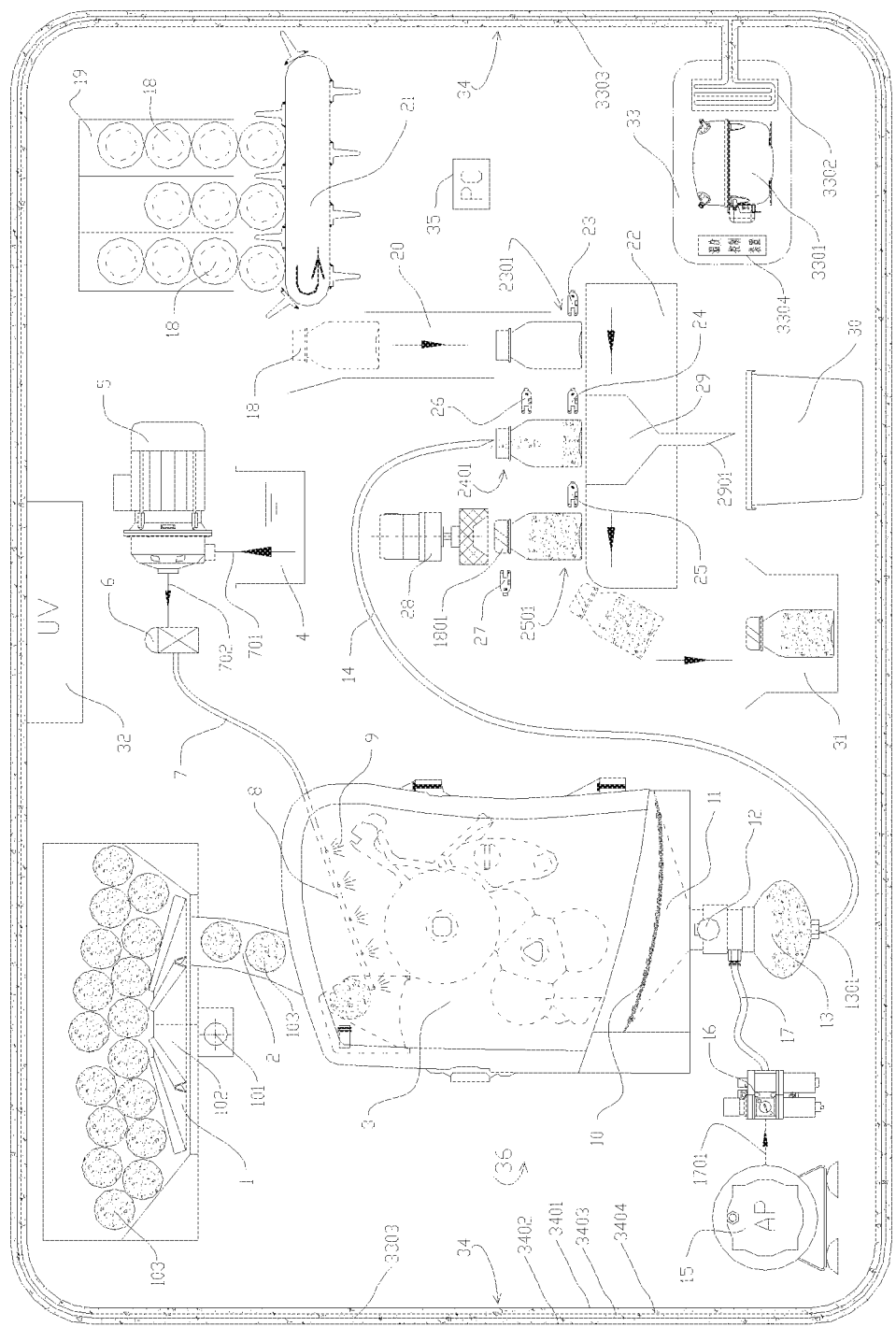
FIG. 1 is a schematic view of a technological process in accordance with the present application.
Figure 2:
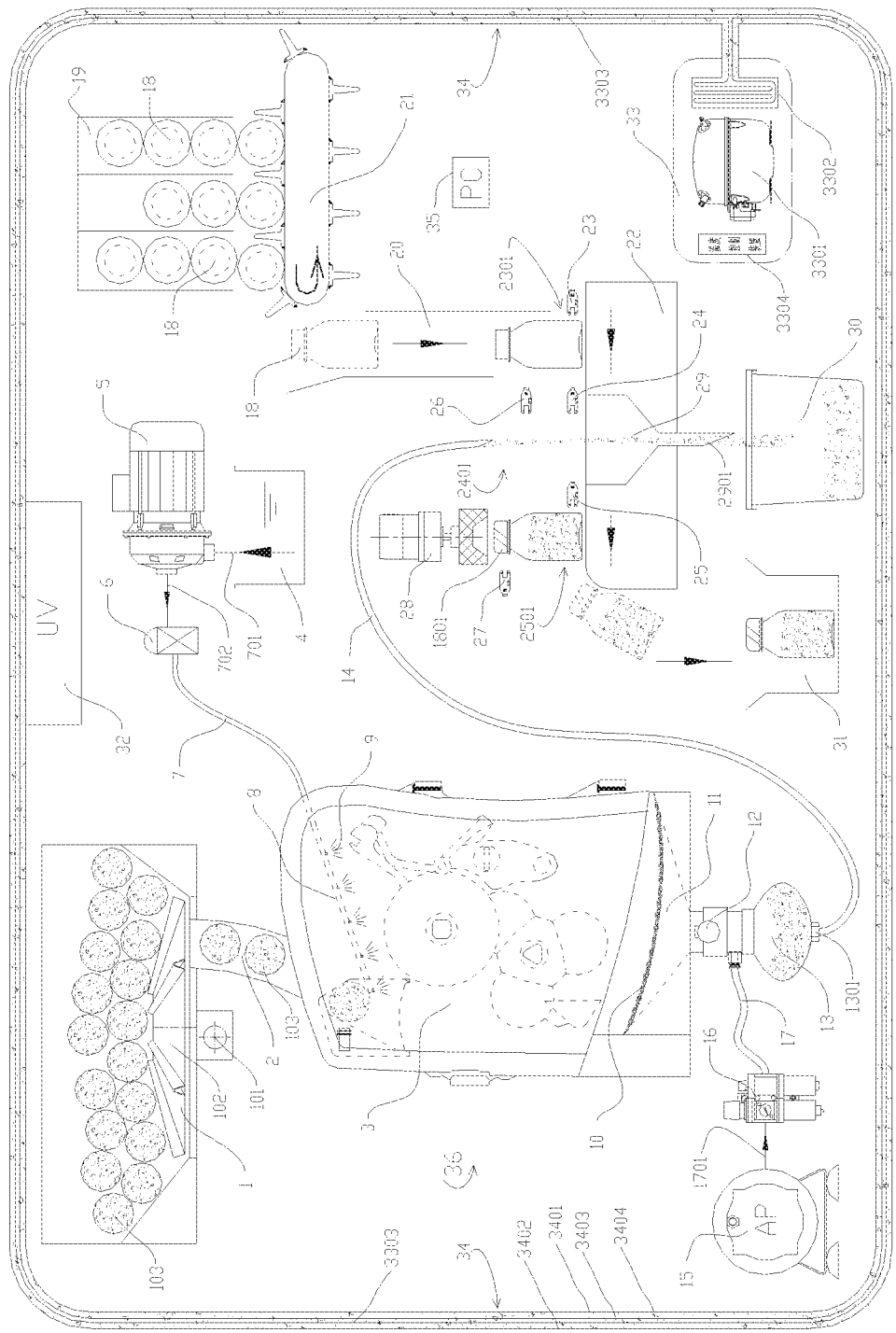
FIG. 2 is a schematic view of a spraying and cleaning process in accordance with the present application.
Figure 3:
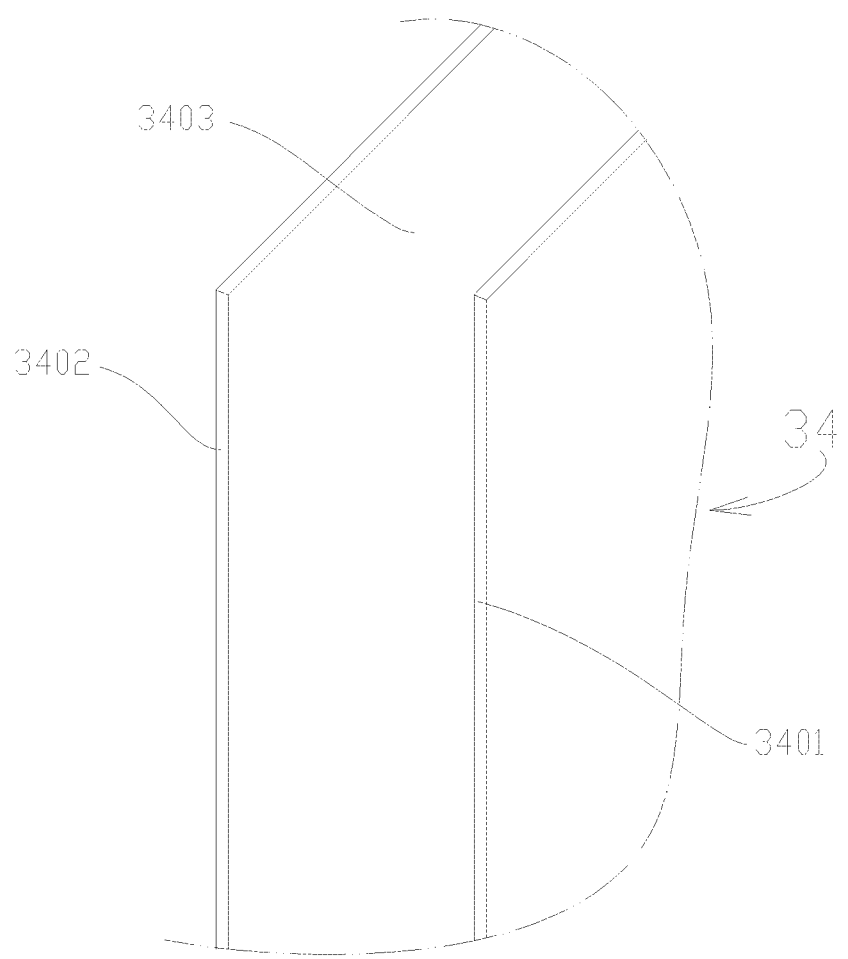
FIG. 3 is a sectional schematic view of a heat-insulating chamber in accordance with the present application.
Figure 4:
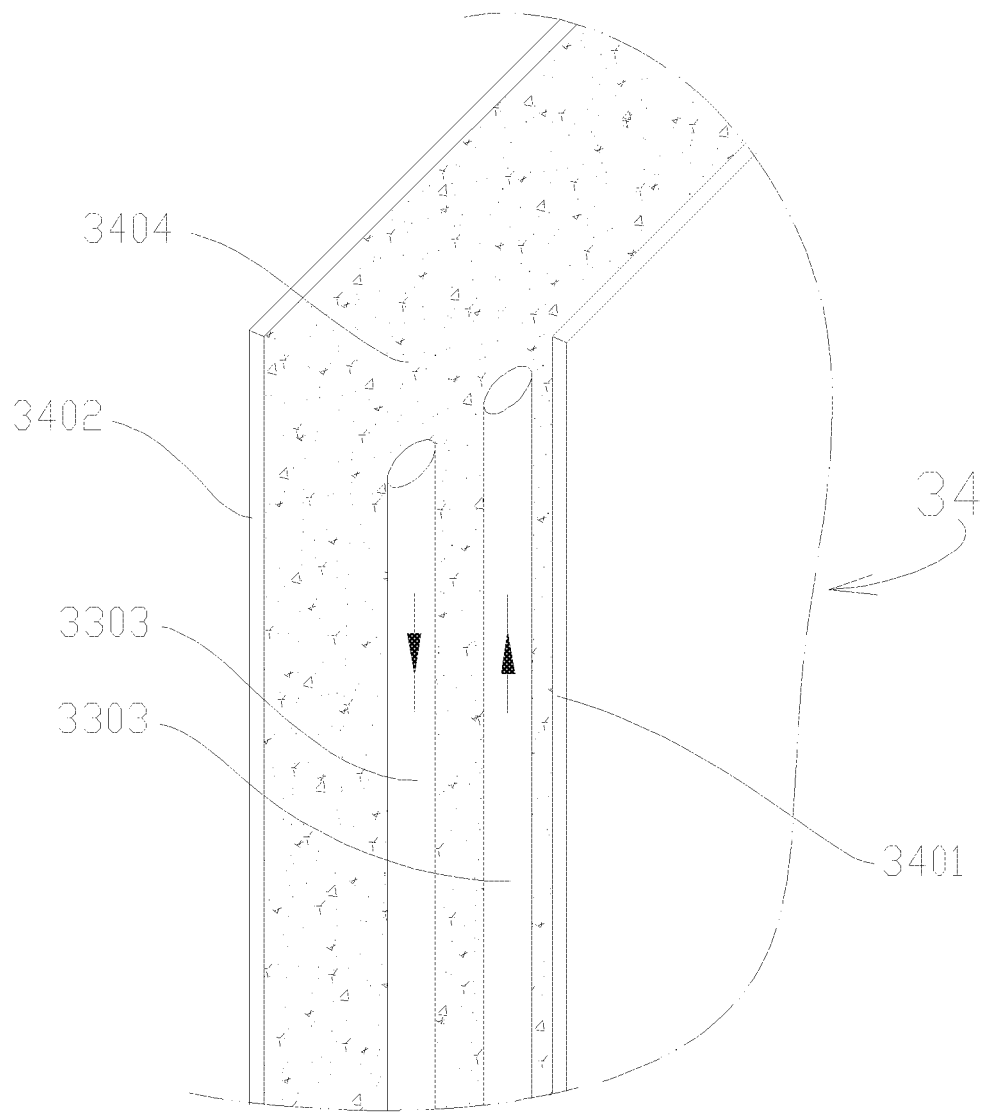
FIG. 4 is a sectional schematic view of a heat-insulating chamber being equipped with a built-in condenser in accordance with the present application.

Reference Signs: 1—rotary material basket; 101—driving motor; 102—rotary table; 103—orange; 2—transportation guide device; 3—juicer; 4—water supply tank; 5—high pressure water pump; 6—pressure boosting device; 7—spraying transportation pipeline; 701—pump inlet connecting pipeline; 702—pump outlet connecting pipeline; 8—spraying pipeline; 9—spraying head; 10—movable filter; 11—orange juice collecting funnel; 12—filling control valve; 13—filling oval container; 1301—filling oval container outlet; 14—filling transportation pipeline; 15—high pressure air pump; 16—air processing and purifying device; 17—high pressure air transportation pipeline; 1701—air pump outlet connecting pipeline; 18—bottle; 1801—bottle cap; 19—bottle container; 20—bottle guide device; 21—bottle transportation mechanism; 22—bottle transverse transportation mechanism; 23—bottle inlet position detecting device; 2301—bottle inlet position; 24—bottle filling position detecting device; 2401—bottle filling position; 25—bottle capping position detecting device; 2501—bottle capping position; 26—filling position liquid level detecting device; 27—bottle cap locking detecting device; 28—automatic capping mechanism; 29—liquid recycle guiding device; 2901—liquid recycle guiding device outlet; 30—liquid recycle bucket; 31—finished product receiving device; 32—UV sterilization device; 33—refrigerating system; 3301—compressor; 3302—evaporator; 3303—condenser; 3304—temperature control device; 34—heat-insulating chamber; 3401—thin inner wall; 3402—thin outer wall; 3403—middle cavity; 3404—foaming heat-insulating material; 35—control center; 36—inner chamber.

DESCRIPTION OF EMBODIMENTS

The present application will be further described with reference to the accompanying drawings and embodiments.

An apparatus for making freshly squeezed orange juice, including a rotary material basket 1, a transportation guide device 2, a juicer 3, a water supply tank 4, a high pressure water pump 5, a pressure boosting device 6, a spraying transportation pipeline 7, a spraying pipeline 8, a spraying head 9, a movable filter 10, an orange juice collecting funnel 11, a filling control valve 12, a filling oval container 13, a filling transportation pipeline 14, a high pressure air pump 15, an air processing and purifying device 16, a high pressure air transportation pipeline 17, a bottle 18, a bottle container 19, a bottle guide device 20, a bottle transportation mechanism 21, a bottle transverse transportation mechanism 22, a bottle inlet position detecting device 23, a bottle filling position detecting device 24, a bottle capping position detecting device 25, a filling position liquid level detecting device 26, a bottle cap locking detecting device 27, an automatic capping mechanism 28, a liquid recycle guiding device 29, a liquid recycle bucket 30, a finished product receiving device 31, a UV sterilization device 32, a refrigerating system 33, a heat-insulating chamber 34, and a control center 35. The rotary material basket 1, the transportation guide device 2, the juicer 3, the water supply tank 4, the high pressure water pump 5, the pressure boosting device 6, the spraying transportation pipeline 7, the spraying pipeline 8, the spraying head 9, the movable filter 10, the orange juice collecting funnel 11, the filling control valve 12, the filling oval container 13, the filling transportation pipeline 14, the high pressure air pump 15, the air processing and purifying device 16, the high pressure air transportation pipeline 17, the bottle 18, the bottle container 19, the bottle guide device 20, the bottle transportation mechanism 21, the bottle transverse transportation mechanism 22, the bottle inlet position detecting device 23, the bottle filling position detecting device 24, the bottle capping position detecting device 25, the filling position liquid level detecting device 26, the bottle cap locking detecting device 27, the automatic capping mechanism 28, the liquid recycle guiding device 29, the liquid recycle bucket 30, the finished product receiving device 31 and the UV sterilization device 32 are arranged in an inner chamber 36 of the heat-insulating chamber 34, so as to ensure that freshly squeezed orange juice is always stored at a constant temperature and will not be contaminated by external environment. The rotary material basket 1, the juicer 3, the high pressure water pump 5, the filling control valve 12, the high pressure air pump 15, the bottle transportation mechanism 21, the bottle transverse transportation mechanism 22, the bottle inlet position detecting device 23, the bottle filling position detecting device 24, the bottle capping position detecting device 25, the filling position liquid level detecting device 26, the bottle cap locking detecting device 27, the automatic capping mechanism 28, the UV sterilization device 32 and the refrigerating system 33 are controlled uniformly by instructions given by the control center 35.

The rotary material basket 1 is arranged at a top of the juicer 3 and is connected with the juicer 3 via the transportation guide device 2.

The water supply tank 4 is arranged at a bottom of the heat-insulating chamber 34 and is connected with the high pressure water pump 5 via a pump inlet connecting pipeline 701. The high pressure water pump 5 is connected with the pressure boosting device 6 via a pump outlet connecting pipeline 702. The pressure boosting device 6 is connected to the spraying pipeline 8 via the spraying transportation pipeline 7. The spraying head 9 is arranged on the spraying pipeline 8. The spraying pipeline 8 is connected to an upper portion of the interior of the juicer 3 via a fastener.

The filling oval container 13 is connected with and arranged below the filling control valve 12. The orange juice collecting funnel 11 is connected with and arranged above the filling control valve 12. The orange juice collecting funnel 11 is connected with a lower portion of the interior of the juicer 3 via a fastener. The movable filter 10 is arranged at the lower portion of the interior of the juicer 3 and is connected with and arranged above the orange juice collecting funnel 11.

The high pressure air pump 15 is arranged at the bottom of the heat-insulating chamber 34 and is connected with the air processing and purifying device 16 via a pump outlet connecting pipeline 1701. The air processing and purifying device 16 is connected with a junction between the filling oval container 13 and the filling control valve 12 via the high pressure air transportation pipeline 17.

A filling oval container outlet 1301 is connected to a bottle filling position 2401 via the filling transportation pipeline 14.

The bottle 18 is arranged in the bottle container 19. The bottle container 19 is arranged above the bottle transportation mechanism 21. The bottle 18 is transported to the bottle guide device 20 via the bottle transportation mechanism 21, and then falls to a bottle inlet position 2301. The bottle 18 is transported from the bottle inlet position 2301 to a bottle filling position 2401 via the bottle transverse transportation mechanism 22. The bottle 18 is transported from the bottle filling position 2401 to a bottle capping position 2501 via the bottle transverse transportation mechanism 22. The bottle 18 is capped with a bottle cap 1801 via the automatic capping mechanism 28. The automatic capping mechanism 28 is arranged above the bottle capping position 2501. The bottle 18 is transported into the finished product receiving device 31 via the bottle transverse transportation mechanism 22 after being capped with the bottle cap 1801.

The liquid recycle guiding device 29 is arranged below the bottle filling position 2401 and is connected with the bottle transverse transportation mechanism 22 via a bolt. The liquid recycle bucket 30 is arranged at the bottom of the heat-insulating chamber 34 and is connected with a liquid recycle guiding device outlet 2901.

The UV sterilization device 32 is arranged at an upper portion of the heat-insulating chamber 34 and is close to the rotary material basket 1.

The heat-insulating chamber 34 includes a thin inner wall 3401 and a thin outer wall 3402 and a middle cavity 3403 defined therein. The middle cavity 3403 of the heat-insulating chamber 34 is filled with a foaming heat-insulating material 3404.

The refrigerating system 33 includes a compressor 3301, an evaporator 3302, a condenser 3303 and a temperature control device 3304. The condenser 3303 of the refrigerating system 33 is arranged at the middle cavity 3403 of the heat-insulating chamber 34 and is spirally arranged at a side close to the thin inner wall 3401.

The control center 35 controls all the executive components.

Compared with the prior art, the present application realizes producing and controlling in a coordinated process, and has a high degree of automation on processing devices, and has no contamination in producing process, and can keep working at a constant temperature, which guarantee the safety and quality of product.

Embodiment 1

With respect to an apparatus for making freshly squeezed orange juice, specific operation steps includes:

The refrigerating system 33 starts to work, under the control of the temperature control device 3304, the inner chamber 36 is kept at a constant temperature adjustably ranging from minus 10° C. to plus 25° C.

The UV sterilization device 32 is turned on by the control center 35, and then sterilizes the inner chamber 36 of the heat-insulating chamber 34 in real time.

In the rotary material basket 1, a driving motor 101 drives a rotary table 102 to rotate, which drives an orange 103 to fall from the rotary material basket 1 into the transportation guide device 2 and the orange 103 is further transported into the juicer 3 by the transportation guide device 2. The juicer 3 starts to works. Freshly squeezed orange juice flows through the movable filter 10 and the orange juice collecting funnel 11, and then flows into the filling oval container 13. The filling control valve 12 is open, which ensures that the orange juice in the juicer 3 can smoothly flow into the filling oval container 13. Then the filling control valve 12 is closed after all orange juice flows into the filling oval container 13.

The bottle 18 is transported to the bottle guide device 20 via the bottle transportation mechanism 21 and then falls into the bottle inlet position 2301. The bottle 18 is transported from the bottle inlet position 2301 to the bottle filling position 2401 via the bottle transverse transportation mechanism 22 and stays there waiting for being filled.

The high pressure air pump 15 transports high pressure air through the air processing and purifying device 16 and then into the high pressure air transportation pipeline 17, and then is quickly injected into the filling oval container 13. The high pressure air generated by the high pressure air pump 15 makes the freshly squeezed orange juice in the filling oval container 13 flow through the filling transportation pipeline 14 and then quickly injected into the bottle 18 which is waiting for being filled at the bottle filling position 2401.

All freshly squeezed orange juice in the filling oval container 13 is filled into the bottle 18 which is waiting for being filled at the bottle filling position 2401. The bottle 18 is transported from the bottle filling position 2401 to the bottle capping position 2501 via the bottle transverse transportation mechanism 22. The bottle 18 is capped with the bottle cap 1801 via the automatic capping mechanism 28. The bottle 18 is transported into the finished product receiving device 31 via the bottle transverse transportation mechanism 22 after being capped with the bottle cap 1801.

The process of the apparatus for making freshly squeezed orange is completed.

Embodiment 2

A spraying and cleaning process of the apparatus for making freshly squeezed orange juice includes steps as follows:

The high pressure water pump 5 transports cleaning liquid (which is in the water supply tank 4) through the pump inlet connecting pipeline 701, the pump outlet connecting pipeline 702, the pressure boosting device 6, the spraying transportation pipeline 7, and then into the spraying pipeline 8. The high pressure liquid in the spraying pipeline 8 is sprayed into the juicer 3 via the spraying head 9 for high pressure spraying and cleaning. The juicer 3 remains in operation during the spraying and cleaning process. The cleaning liquid in the juicer 3 flows through the movable filter 10, through the orange juice collecting funnel 11, and then into the filling oval container 13. The filling control valve 12 is open, and after all cleaning liquid in the orange juice collecting funnel 11 flows into the filling oval container 13, the filling control valve 12 is closed.

The high pressure air pump 15 transports high pressure air through the air processing and purifying device 16 into the high pressure air transportation pipeline 17, and is then quickly injected into the filling oval container 13. The high pressure air generated by the high pressure air pump 15 makes the cleaning liquid in the filling oval container 13 flow through the filling transportation pipeline 14, and then quickly injected into the liquid recycle guiding device 29, and then flow into the liquid recycle bucket 30.

Technical principles of the present application have been described above in accordance with specific embodiments. These descriptions are merely for explaining the principle of the present application and cannot, in any way, limit the protection scope of the present application. Based on explanations herein, other specific embodiments of the present application obtained by those skilled in the art without any creative effort shall be within the protection scope of the present application.

What is claimed is:

1. An apparatus for making freshly squeezed orange juice, comprising: a rotary material basket (1), a transportation guide device (2), a juicer (3), a water supply tank (4), a high pressure water pump (5), a pressure boosting device (6), a spraying transportation pipeline (7), a spraying pipeline (8), a spraying head (9), a movable filter (10), an orange juice collecting funnel (11), a filling control valve (12), a filling oval container (13), a filling transportation pipeline (14), a high pressure air pump (15), an air processing and purifying device (16), a high pressure air transportation pipeline (17), a bottle (18), a bottle container (19), a bottle guide device (20), a bottle transportation mechanism (21), a bottle transverse transportation mechanism (22), a bottle inlet position detecting device (23), a bottle filling position detecting device (24), a bottle capping position detecting device (25), a filling position liquid level detecting device (26), a bottle cap locking detecting device (27), an automatic capping mechanism (28), a liquid recycle guiding device (29), a liquid recycle bucket (30), a finished product receiving device (31), a UV sterilization device (32), a refrigerating system (33), a heat-insulating chamber (34), and a control center (35); wherein the rotary material basket (1) is arranged at a top of the juicer (3) and is connected with the juicer (3) via the transportation guide device (2); the water supply tank (4) is arranged at a bottom of the heat-insulating chamber (34) and is connected with the high pressure water pump (5) via a pump inlet connecting pipeline (701); the high pressure water pump (5) is connected with the pressure boosting device (6) via a pump outlet connecting pipeline (702); the pressure boosting device (6) is connected with the spraying pipeline (8) via the spraying transportation pipeline (7); the spraying head (9) is arranged on the spraying pipeline (8); the filling oval container (13) is connected with and arranged below the filling control valve (12); the orange juice collecting funnel (11) is connected with and arranged above the filling control valve (12); the orange juice collecting funnel (11) is connected with a lower portion of an interior of the juicer (3) via a fastener; the high pressure air pump (15) is arranged at the bottom of the heat-insulating chamber (34) and is connected with the air processing and purifying device (16) via a pump outlet connecting pipeline (1701); the air processing and purifying device (16) is connected to a junction between the filling oval container (13) and the filling control valve (12) via the high pressure air transportation pipeline (17); the bottle (18) is arranged in the bottle container (19); the bottle container (19) is arranged above the bottle transportation mechanism (21); the liquid recycle guiding device (29) is arranged below a bottle filling position (2401); the UV sterilization device (32) is arranged at an upper portion of the heat-insulating chamber (34) and is close to the rotary material basket (1).

2. The apparatus for making freshly squeezed orange juice according to claim 1, wherein in the rotary material basket (1), a driving motor (101) drives a rotary table (102) to rotate, which drives an orange (103) to fall from the rotary material basket (1) into the transportation guide device (2), and the orange (103) is further transported into the juicer (3) through the transportation guide device (2).

3. The apparatus for making freshly squeezed orange juice according to claim 1, wherein the bottle (18) is transported to the bottle guide device (20) via the bottle transportation mechanism (21) and then falls into a bottle inlet position (2301); the bottle (18) is transported from the bottle inlet position (2301) to a bottle filling position (2401) via the bottle transverse transportation mechanism (22) and stays there waiting for being filled; the bottle (18) is transported from the bottle filling position (2401) to a bottle capping position (2501) via the bottle transverse transportation mechanism (22); the bottle (18) is capped with a bottle cap (1801) via the automatic capping mechanism (28), the automatic capping mechanism (28) is arranged above the bottle capping position (2501); the bottle (18) is transported into the finished product receiving device (31) via the bottle transverse transportation mechanism (22) after being capped with the bottle cap (1801).

4. The apparatus for making freshly squeezed orange juice according to claim 1, wherein the heat-insulating chamber (34) comprises a thin inner wall (3401) and a thin outer wall (3402) and a middle cavity (3403) defined therein; the middle cavity (3403) of the heat-insulating chamber (34) is filled with a foaming heat-insulating material (3404).

5. The apparatus for making freshly squeezed orange juice according to claim 1, wherein the refrigerating system (33) comprises a compressor (3301), an evaporator (3302), a condenser (3303) and a temperature control device (3304); the condenser (3303) of the refrigerating system (33) is arranged at a middle cavity (3403) of the heat-insulating chamber (34) and is spirally arranged at a thin inner wall (3401).

* * * * *